May 30, 1950   O. J. HUELSTER   2,509,501
PRONGED SNAP FASTENER
Filed Aug. 10, 1946
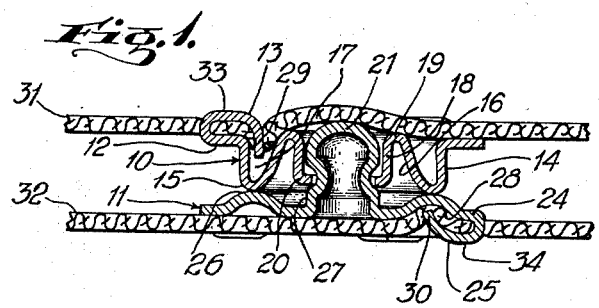
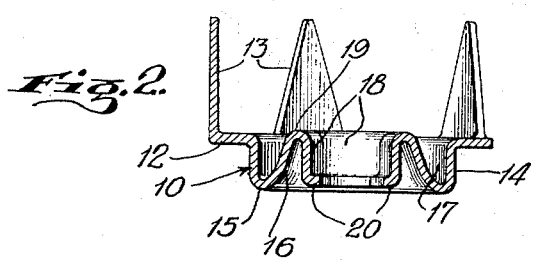
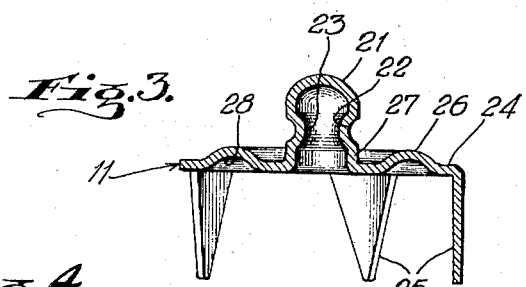
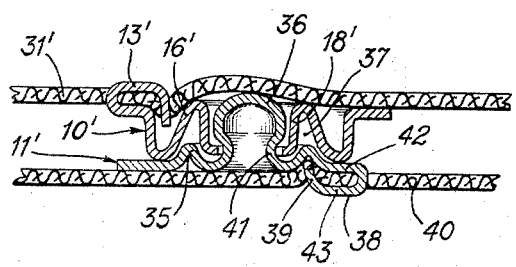
INVENTOR
OTTO J. HUELSTER
BY
*Howard Thompson*
ATTORNEY Patented May 30, 1950

2,509,501

UNITED STATES PATENT OFFICE 2,509,501

PRONGED SNAP FASTENER

Otto J. Huelster, Waterbury, Conn., assignor to Scovill Manufacturing Company, Waterbury, Conn., a corporation of Connecticut Application August 10, 1946, Serial No. 689,746

6 Claims. (Cl. 24—217)

This invention relates to snap fasteners of the type and kind employing socket and stud parts adapted for detachable engagement one with respect to the other in detachably securing supports together. More particularly, the invention deals with devices of the kind defined, wherein both the socket and stud parts are formed from single sheets of material and, further, wherein the securing prongs are integral with peripheral edge portions of said parts and adapted to be folded and clinched onto the respective parts and supports arranged therebetween in securely retaining the parts of said supports. Still more particularly, the invention deals with socket and stud parts having recessed or channel portions, into which the ends of prongs, as well as parts of the supports, are adapted to extend in securely retaining the fastener parts against shifting on or displacement from the support.

The novel features of the invention will be best understood from the following description, when taken together with the accompanying drawing, in which certain embodiments of the invention are disclosed and, in which, the separate parts are designated by suitable reference characters in each of the views, and in which:

Fig. 1 is a longitudinal section through a fastener made according to my invention.

Fig. 2 is a sectional view of the socket part shown in Fig. 1, prior to attachment to a support.

Fig. 3 is a sectional view through the stud part prior to attachment to its support; and Fig. 4 is a view similar to Fig. 1 showing a modification.

In fasteners of the general type and kind under consideration, it has been the custom to employ, in conjunction with socket and stud parts, independent means such, for example, as pronged rings for securing the parts to the respective supports. This procedure, in addition to necessitating the formation of independent parts and the handling of independent parts, has also complicated attachment of the fastener parts to the supports, particularly in alining the two companion parts of each fastener part one with respect to the other and to the support.

According to my present invention, each fastener part has, included as an integral part thereof, prong devices for attachment of the fastener part to a support and, further, in the provision of the annular recesses or indentures in the fastener part for reception of the prong ends.

Still more particularly, each fastener part, that is to say, a socket part and a companion stud part includes offset annular portions, forming the recesses, with said offset annular portions arranged in common alinement so as to provide abutting surfaces between said parts when the parts are secured together.

In the accompanying drawing, I have shown an adaptation of my invention, in which, 10 represents a socket part of a snap fastener and 11 the stud part. The socket part comprises an annular ring-like body 12, at the peripheral edge of which is a series of integral prongs 13, normally extending angularly to the body 12, substantially at right angles. Extending from the inner end of the ring body 12 is an annular wall portion 14, extending in a direction opposite to that of the prongs 13 and also substantially at right angles to the body 12. Extending integrally from the lower end of the wall 14 and joining the same in a curved wall portion 15 is an upwardly and inwardly curved breast wall portion 16, which forms between the same and the wall 14 an annular chamber or recess 17. Extending integrally from the upper edge portion of the breast wall portion 16 are a plurality of downwardly extending yieldable fingers 18, joining the wall portion 16 in curved portions 19. The fingers 18 are disposed inwardly of and in spaced relation to the wall 16 to give free resiliency to said fingers within the wall 16. The lower ends of the fingers 18 have inwardly and radially offset flanges 20, adapted to be engaged by the head 21 of the stud part 11 and to enter an annular recess 22 in the neck portion 23 of said head.

The stud part 11 comprises a disc or plate 24 having, at the peripheral edge thereof, downwardly extending prongs 25 disposed substantially at right angles to the disc 24. The disc 24 is reinforced by an upwardly offset annular ring portion 26 of curved cross-sectional form, as clearly seen in Fig. 3 of the drawing. The head 22 is struck upwardly from the central portion of the disc 24 and the inwardly pressed neck portion 23 joins the disc 24 in an annular collar portion 27, the diameter of which is substantially the same as the greatest diameter of the head 21.

In the above description, reference is made to upwardly and downwardly and these terms are used only with respect to the showing in the accompanying drawing. In other words, if the assembled parts 10 and 11 were reversed, as seen in Fig. 1 as well as in Figs. 2 and 3, then the directions referred to would be reversed. It will be apparent that the upwardly pressed annular portion 26 is of a diameter to register with the rounded portion 15 joining the walls 14 and 16, so that direct abutment between the two parts 10 and 11 takes place at these limited or restricted surfaces.

It will also be understood that the offset portion 26 forms an annular recess 28, similar in some respects to the recess 17, in reception of the free end portions 29 of the prongs 13 and 30 of the prongs 25, respectively, as in Fig. 1 of the drawing.

In attaching the parts 10 and 11 to respective supports 31 and 32, indicated in Fig. 1, the prongs are first passed through the supports and, then, by the use of suitable tools, are bent inwardly upon the surface of the supports and, then, finally the ends 29 and 30, respectively, are forced in the direction of the recesses 17 and 28 in securely anchoring the parts to the support. In this operation, the prong ends 29 pass through the support 31 and the prong ends 33 extend into the support 32 in the manner diagrammatically illustrated in Fig. 1. It will appear that the parts 33 of the prongs 13 are substantially parallel to the ring body 12 and, in like manner, the parts 34 of the prongs 25 are parallel to the disc 24, thus providing a firm grip of the prongs upon the supports, the supports being squeezed or compressed at these positions.

It will appear from a consideration of Figs. 1 and 2 of the drawing that the fingers 18 are substantially parallel to the wall 14 and both at right angles to the body 12. It will also appear that the upper curved portion 19 extends beyond the upper surface of the body 12, thus maintaining the socket portion within the environment of the socket part as a whole, while, at the same time, providing relatively long fingers 18 for free spring action.

In Fig. 4 of the drawing, I have shown a slight modification, wherein a socket part 10' is substantially similar to the socket part 10. The stud part 11' differs from the part 11 in arranging the annular upwardly offset ring portion 35 closer to the stud head 36, so as to extend into the annular chamber 37. The chamber 37 is formed between the breast wall 16' and the spring-fingers 18'. The curvature of the annular offset portion 35 is also more abrupt than the corresponding portion 26 of Figs. 1 and 3 and is arranged to fit closely adjacent the breast wall 16' to provide sufficient clearance for free movement of the spring-fingers 18', as will be apparent. This construction arranges the socket and stud parts in closer proximity to each other, thus minimizing the overall thickness of the assembled parts. The stud part 11' has, at its periphery, circumferentially spaced prongs 38, end portions 39 of which extend into the support 40 and the offset portion 35, as clearly seen.

At 31' is shown the support, similar to the support 31, and at 13' is shown the prongs similar to the prongs 13. As all other parts of the socket 10 are the same as that shown in Fig. 1, no further detail description is given.

The stud part 11' further differs from the stud part 11 in having a single neck portion 41 and in dispensing with the collar portion 27, shown in Figs. 1 and 3, to compensate for the closer arrangement of the parts and to provide for inward movement of the spring-fingers 18' to engage the head 36.

Another difference in the stud part shown in Fig. 4 lies in the fact that the annular disc portion 42 is of greater radial width beyond the offset 35 so as to establish a longer bearing surface upon the support 40 and also a longer portion 43 on the prongs 38 substantially paralleling the disc portion 42 and between which the support 40 is firmly squeezed.

It will appear from a consideration of Figs. 1 and 4 of the drawing, that, in both forms of construction shown, each fastener part, that is, the socket and stud parts, has wall portions which form annular recesses opening through opposed surfaces of the parts. One recess of each part is adapted to receive the prong ends and the other recess provides room for free movement of the spring members of the socket part, particularly in the structure shown in Fig. 4 where the parts are brought into close proximity to each other.

Having fully described my invention, what I claim as new and desire to secure by Letters Patent is:

1. A fastener of the class described, comprising a socket part, said part having a flat annular body, a plurality of prongs extending from one surface of said body and spaced at the peripheral edge thereof, an annular wall extending at right angles to the other surface of said body, a breast wall arranged within and extending continuously with said annular wall and spaced therefrom to form an annular recess opening through an extension of the first surface of said body, a plurality of circumferentially spaced spring fingers extending integrally from said breast wall and disposed within said breast wall, and the major portion of said fingers and said annular wall being normally parallel to each other.

2. A fastener of the class described, comprising a socket part, said part having a flat annular body, a plurality of prongs extending from one surface of said body and spaced at the peripheral edge thereof, an annular wall extending away from the other surface of said body, a breast wall arranged within and extending continuously with said annular wall and spaced therefrom to form an annular recess opening through an extension of the first surface of said body, a plurality of circumferentially spaced spring fingers extending integrally from said breast wall and disposed within said breast wall, and said prongs having end portions extending into said annular recess in securing said fastener part to a support by said prongs.

3. A fastener of the class described, comprising a socket part, said part having a flat annular body, a plurality of prongs extending from one surface of said body and spaced at the peripheral edge thereof, an annular wall extending away from the other surface of said body, a breast wall arranged within and extending continuously with said annular wall and spaced therefrom to form an annular recess opening through an extension of the first surface of said body, a plurality of circumferentially spaced spring fingers extending integrally from said breast wall and disposed within said breast wall, said breast wall joining the spring fingers in a rounded annular edge portion, and said prongs having end portions extending into said annular recess in securing said fastener part to a support by said prongs.

4. A fastener of the class described comprising a body part having offset walls defining two annular recesses opening through opposed surfaces of said part, means centrally of said part and partially defined by one of said wall portions for attaching the same to a companion fastener part, the periphery of said part having circumferentially spaced prongs, said prongs being adapted for passage through a support for securing the part thereto, and said prongs being crimped onto the support and having ends extending into one of said annular recesses.

5. A fastener of the class described comprising socket and stud parts, said socket part having offset walls defining two annular recesses opening through opposed surfaces of said socket part, means centrally of said socket part and partially defined by one of said walls for attaching the same to said stud part, the periphery of said socket part having circumferentially spaced prongs, said prongs being adapted for passage through a support for securing the socket part thereto, said prongs being crimped onto the support and having ends extending into one of said annular recesses, and said stud part having a base flange with an offset ring portion adapted to enter the other annular recess of said socket part in nested relationship.

6. A fastener of the class described comprising socket and stud parts, said socket part having offset walls defining two annular recesses opening through opposed surfaces of said socket part, means centrally of said socket part and partially defined by one of said walls for attaching the same to said stud part, means for attaching said socket to a support, said stud part having a base flange with an offset ring portion defining a raised rib on one side of the flange and an annular recess on the opposite side of said flange, the periphery of said stud flange having circumferentially spaced prongs, said prongs being adapted for passage through a support and clamped thereagainst with their ends extending into said stud annular recess for securing the stud part to its support, and said stud rib adapted to enter one of the annular recesses of said socket part in nested relationship.

OTTO J. HUELSTER.

REFERENCES CITED

The following references are of record in the file of this patent:

UNITED STATES PATENTS

| Number | Name | Date |
|---|---|---|
| 667,874 | Fisher | Feb. 12, 1901 |
| 1,425,006 | Goldstein | Aug. 8, 1922 |
| 1,654,118 | Dyressen | Dec. 27, 1927 |
| 2,015,049 | Carr | Sept. 17, 1935 |
| 2,310,007 | Wolff | Feb. 2, 1943 |